US011972463B1

United States Patent
Nguyen et al.

(10) Patent No.: US 11,972,463 B1
(45) Date of Patent: Apr. 30, 2024

(54) PER-CATEGORY FEEDBACK SUMMARIZATION

(71) Applicant: Amazon Technologies, Inc., Seattle, WA (US)

(72) Inventors: Thi Nhat Anh Nguyen, Gwynneville (AU); Karen Hovsepian, Mercer Island, WA (US); Mingwei Shen, Shoreline, WA (US)

(73) Assignee: Amazon Technologies, Inc., Seattle, WA (US)

( * ) Notice: Subject to any disclaimer, the term of this patent is extended or adjusted under 35 U.S.C. 154(b) by 475 days.

(21) Appl. No.: 17/217,454

(22) Filed: Mar. 30, 2021

Related U.S. Application Data

(60) Provisional application No. 63/144,212, filed on Feb. 1, 2021.

(51) Int. Cl.
*G06F 17/00* (2019.01)
*G06F 16/35* (2019.01)
*G06F 40/166* (2020.01)
*G06F 40/30* (2020.01)
*G06N 3/088* (2023.01)
*G06Q 30/0282* (2023.01)

(52) U.S. Cl.
CPC ....... *G06Q 30/0282* (2013.01); *G06F 16/353* (2019.01); *G06F 40/166* (2020.01); *G06F 40/30* (2020.01); *G06N 3/088* (2013.01)

(58) Field of Classification Search
CPC ... G06Q 30/0282; G06F 40/166; G06F 40/30; G06F 16/345; G06F 15/93; G06F 16/24578; G06F 40/253; G06F 16/358; G06F 16/35; G06F 16/334; G06N 3/088
USPC ........................................................ 705/347
See application file for complete search history.

(56) References Cited

U.S. PATENT DOCUMENTS

2017/0249384 A1* 8/2017 Kandylas .............. G06F 16/358
2019/0377955 A1* 12/2019 Swaminathan .. H04N 21/23418
2021/0064956 A1* 3/2021 Zhiltsov .................. G06F 17/18

* cited by examiner

*Primary Examiner* — Jason T Edwards
(74) *Attorney, Agent, or Firm* — K&L Gates LLP

(57) ABSTRACT

Devices and techniques are generally described for generating per-topic review summarization. In some examples, a plurality of text descriptions of a first item may be received. In at least some examples, a list of categories may be determined. In some examples, at least one machine learned model may generate a first summary of the plurality of text descriptions. In some examples, the first summary may be relevant to a first category of the list of categories. In further examples, the at least one machine learned model may generate a second summary of the plurality of text descriptions. The second summary may be relevant to a second category of the list of categories. In various cases, first output data that includes the first summary and the second summary may be generated.

20 Claims, 7 Drawing Sheets

PER-CATEGORY FEEDBACK SUMMARIZATION

CROSS REFERENCE TO RELATED APPLICATIONS

This application claims the benefit of U.S. Provisional Patent Application No. 63/144,212, filed Feb. 1, 2021, the disclosure of which is incorporated herein by reference in its entirety.

BACKGROUND

Electronic catalogs may be accessible via electronic pages, such as web pages or content pages displayed by a browser or mobile shopping application, with the electronic pages providing front-end user interfaces into the electronic catalogs. An example electronic page may enable users to provide verbal or textual user input reviewing content that the user may have purchased or have knowledge about. In various examples, the reviews may be useful to other users who may be considering purchasing the same content. Detailed reviews may provide other users with insights about the content such as quality, usefulness, user satisfaction, etc., concerning the content.

DETAILED DESCRIPTION

Figure 1:
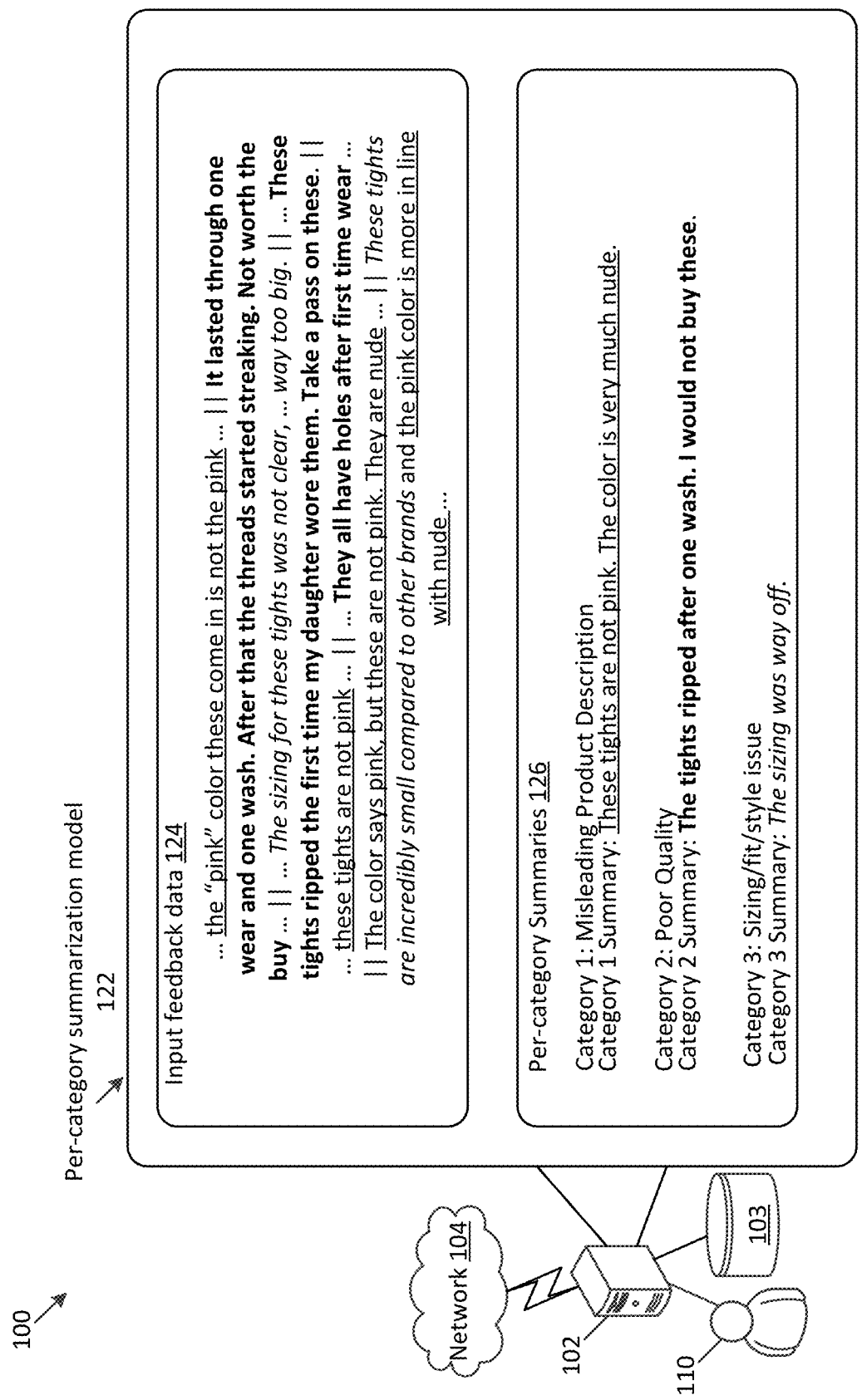
FIG. 1 is a block diagram depicting an example system effective to generate per-category feedback summarization, according to various embodiments of the present disclosure.

In the following description, reference is made to the accompanying drawings that illustrate several examples of the technology described herein. It is understood that other examples may be utilized and various operational changes may be made without departing from the scope of the present disclosure. The following detailed description is not to be taken in a limiting sense, and the scope of the embodiments described herein is defined only by the claims of the issued patent.

Content reviews and ratings (e.g., product reviews, digital media reviews, etc.) provide individuals with detailed insights about various aspects of the content such as quality, usefulness, etc. In various examples, content owners (e.g., sellers, manufacturer's, producers, etc.) may need to read through a large number of reviews and/or other feedback data in order to get a general sense of sentiment concerning their content. Additionally, because content can be multifaceted, the content owners may need to read through the feedback data several times in order to manually compile summaries of user sentiment/feedback for each different facet of interest.

For example, a clothing manufacturer may have hundreds or thousands of reviews about a particular shirt made by the clothing manufacturer. There may be several reviews that mention that the quality of the material needs improvement, while there may be another (potentially overlapping) set of reviews that mention that the color of the shirt is misleading. Finally, another set of reviews may mention that the graphics on the shirt are not properly centered. Accordingly, these three different sets of reviews may correspond to different categories (e.g., product quality, product color, and graphics). The particular categories may differ for different types of content. For example, the categories relevant to clothing may differ widely with respect to the categories of feedback relative to a streaming movie available for purchase/rental.

Described herein is a machine learning-based approach effective to automatically generate per-category summaries of input feedback data. In some examples, the categories may be provided in advance (e.g., as business objectives). However, in various other examples, the categories (sometimes referred to as "topics") may be determined based on the content of the feedback data (e.g., user reviews).

In various examples described herein, reviews are modeled in the context of some categories (e.g., topics) of interest. In particular, category-aware summaries are generated, where each produced summary corresponds to a predefined category that is present in the feedback data (e.g., in a set of user reviews of an item). In various examples, the various machine learning models described herein combine a generative variational autoencoder model with an integrated topic-gating mechanism and a hierarchical structure capturing dependence among products, reviews and categories. Human evaluation of such summaries has shown that the generated summaries are highly relevant, fluent, and representative of the text. Evaluation using a reference dataset has shown that the various models described herein outperform state-of-the art abstractive and extractive baselines.

As volume and scope of online customer reviews continue to explode, so does the need for online sellers to digest and draw insights to improve products. Today, both sellers and customers manually sift through hundreds of reviews across competing products to decipher systemic or trending concerns from isolated or irrelevant issues. Opinion summarization technology run across millions of reviews has drawn much attention due to its potential for streamlined defect discovery, trend analysis, and/or product development. However, in order to be useful, such automatic summarization techniques should be both informative and fluent.

There are two broad document summarization approaches: extractive and abstractive. Extractive summarization generates a summary by selecting words, phrases, and sentences directly from source text. Abstractive summarization generates summaries from an abstract representation of the text. Abstractive summaries include new phrases and words not found in the original text. Compared to extractive summaries, abstractive summaries can be more concise, more informative given the same document length (e.g., in terms of a word limit), and more fluent.

Current state-of-the-art methods for abstractive summarization are based on supervised deep-learning language models, and rely on large amounts of human-written ground-truth summaries. Unsupervised opinion summarization has recently garnered significant attention since text summarization systems are domain-sensitive and ground-truth opinion summaries are expensive to obtain. Unfortunately, summaries generated by unsupervised models are often generic and uninformative, and typically do not provide useful information about different aspects of the product.

Described herein are category-aware unsupervised abstractive summarization models, that generate abstractive summaries for multiple reviews grouped by product, conditioned on a predefined set of topics or classes of interest. These topics can be discovered through existing topic models (e.g., learned topics based on semantic representations of the text), or can correspond to multiple categories defined according to a business need. Alternatively, categories might correspond to outputs of an independent, black-box classifier. When applied in a setting where categories correspond to separate black-box classifiers, the models and techniques described herein provide the means to explain the categories through the per-category summaries of user feedback.

As described in further detail below, the disclosed model combines a generative variational autoencoder (VAE) model with a hierarchical structure that captures dependence among products, reviews (e.g., feedback), and categories. This approach serves to reduce irrelevant or generic sentences and increases salient details. The model also has an integrated topic-gating mechanism which focuses on topical words that increase informativeness of produced summaries with respect to the category of interest. In various examples, the systems and techniques described herein may generate per-category summaries of feedback data. The per-category summaries may be abstractive summaries written in prose or may be lists of non-overlapping phrases that provide key insights about a particular category of the feedback data.

Machine learning techniques, such as those described herein, are often used to form predictions, solve problems, recognize objects in image data for classification, etc. In various examples, machine learning models may perform better than rule-based systems and may be more adaptable as machine learning models may be improved over time by retraining the models as more and more data becomes available. Accordingly, machine learning techniques are often adaptive to changing conditions. Deep learning algorithms, such as neural networks, are often used to detect patterns in data and/or perform tasks.

Generally, in machine learned models, such as neural networks, parameters control activations in neurons (or nodes) within layers of the machine learned models. The weighted sum of activations of each neuron in a preceding layer may be input to an activation function (e.g., a sigmoid function, a rectified linear units (ReLu) function, etc.). The result determines the activation of a neuron in a subsequent layer. In addition, a bias value can be used to shift the output of the activation function to the left or right on the x-axis and thus may bias a neuron toward activation.

Generally, in machine learning models, such as neural networks, after initialization, annotated training data may be used to generate a cost or "loss" function that describes the difference between expected output of the machine learning model and actual output. The parameters (e.g., weights and/or biases) of the machine learning model may be updated to minimize (or maximize) the cost. For example, the machine learning model may use a gradient descent (or ascent) algorithm to incrementally adjust the weights to cause the most rapid decrease (or increase) to the output of the loss function. The method of updating the parameters of the machine learning model is often referred to as back propagation.

Generally, in machine learning, an embedding is a mapping of a discrete, categorical variable to a vector of continuous numbers. In neural networks, embeddings are typically of lower dimensions relative to the data that the embeddings represent. In various examples, token embeddings may be generated to represent various text (e.g., review text) described herein for input into the various machine learning models described herein.

In some other embodiments described herein, an unsupervised heuristic-driven approach to generation of summary insights from feedback data is described. The summary insights may be phrase-length extractive descriptions and/or qualities of the feedback data. The summary insights approach may comprise the following steps: 1) extraction of candidate insights from a collection of feedback, 2) salience scoring of each candidate using a reference classifier, and 3) selection of an optimal subset of insights as output. While the approach for generation of summary insights may be partially heuristic, it may also use various machine learning models, as described herein. For example, a dependency parsing model may be used during step 1; a reference classifier may be used during step 2; and, optionally, a sentence embedding model may be used during step 3.

Automatic document summarization (ADS) is an established and challenging subarea of Natural Language Processing. The objective of automatic document summarization is to produce a concise and fluent summary of an input text document, or a set of documents, while preserving the critical information and overall meaning. In general, ADS research is divided into two broad categories—extractive and abstractive.

Extractive Summaries (ES) are built by selecting fragments of the input document(s), be they sentences or phrases/clauses that make up the sentences, that together capture the key information and semantic meaning of the full input text. In addition to natural language processing, this methodology falls under the category of Information Retrieval (IR), which is a general framework of methods with the shared aim of extracting salient information from raw input data.

Extractive summarization algorithms can be broken down into three independent steps: 1) producing an intermediate representation which encodes the main semantic and linguistic patterns of input document(s), 2) scoring all fragments of the document(s) based on their prominence in said representation, and 3) selecting and compiling together the top scoring fragments. Producing salient intermediate representations is a critical step in this process, with highly diverse approaches spanning topic representation methods, graph mining, as well as supervised machine learning approaches that use word and sentence-level features and/or word vectors. In the case of supervised machine learning approaches, a training set of (text fragment, is Summary label) pairs is used to train a model that can identify which fragments could be included into the final output summary. Specific techniques for generation of summary insights are described in further detail below.

FIG. 1 is a block diagram depicting an example system 100 effective to generate abstractive, per-category feedback summarization, according to various embodiments of the present disclosure. As depicted in FIG. 1, one or more computing devices 102 may be effective to execute a per-category summarization model 122. The per-category summarization model 122 is described in further detail below.

User(s) 110 may be users submitting user reviews that may be input to the per-category summarization model 122 as input feedback data 124. Computing device 102 may communicate with one or more of the other components depicted in FIG. 1 over a network 104 such as a local area network (LAN) and/or a wide area network (WAN) such as the internet. For example, computing device 102 may communicate with one or more non-transitory computer-readable memories 103 via network 104. The one or more non-transitory computer-readable memories 103 may store instructions that, when executed by at least one processor of computing device 102, are effective to program the at least one processor to perform one or more of the various techniques described herein.

The input feedback data 124 may comprise a plurality of user reviews for a given item (e.g., a product for sale on an e-commerce site). In the example depicted in FIG. 1, the reviews are truncated for brevity, and different reviews (e.g., from different users) are separated by "||". In the example of FIG. 1, the per-category summarization model 122 generates per-category summaries 126 for each of three categories; although, in general, the per-category summarization model 122 may generate per-category summaries 126 for any number of categories. The number of categories may be either selected or may be based on the number of distinct categories detected (e.g., using a black box classifier and/or a topic modeling algorithm).

In the example of FIG. 1, the three categories are: Category 1: Misleading Product Description; Category 2: Poor Quality; and Category 3: Sizing/fit/style issue. For each category, a category-specific summary of the input feedback data 124 is provided as the per-category summaries 126. For Category 1, the summary is "These tights are not pink. The color is very much nude." For Category 2, the summary is "The tights ripped after one wash. I would not buy these." For Category 3, the summary is "The sizing was way off." As can be seen in FIG. 1, different emphasis is placed on the text of the input feedback data 124 to show the correspondence between that text and the pertinent summary category. For example, underlined text relates to Category 1, bolded text relates to Category 2, and italicized text relates to Category 3. In some examples, the summaries generated using the per-category summarization model 122 that relate to one category may exclude text and/or information that relates to other, unrelated categories.

Figure 2:
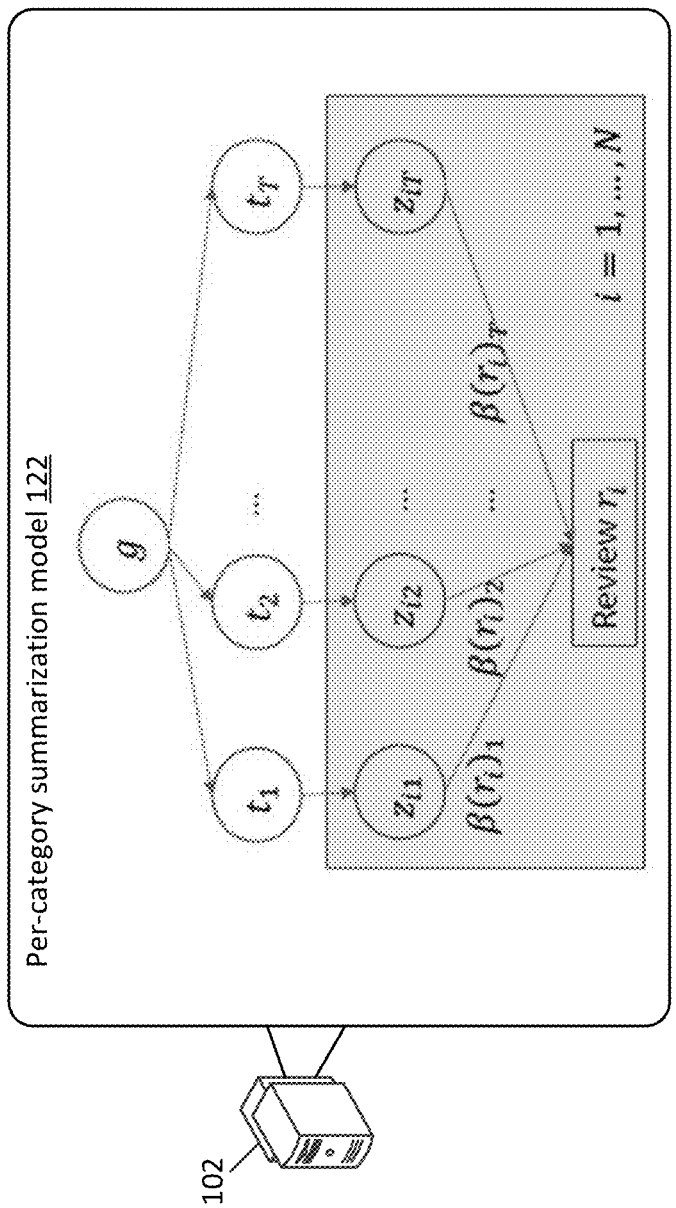
FIG. 2 depicts an example diagram of a per-category summarization model, in accordance with various aspects of the present disclosure.

FIG. 2 depicts an example diagram of a per-category summarization model, in accordance with various aspects of the present disclosure. As previously described, the per-category summarization model 122 combines a generative variational autoencoder (VAE) model with a hierarchical structure that captures dependence among products, reviews (e.g., feedback), and categories. This approach serves to reduce irrelevant or generic sentences and increases salient details. The model also has an integrated topic-gating mechanism which focuses on topical words that increase informativeness of produced summaries with respect to the category of interest.

The per-category summarization model 122 generates multiple summaries—one for each predominant category that may be present in a group of reviews or other feedback data for a given product or other piece of content. In various examples described herein, the terms "topic" and "category" are used interchangeably. The per-category summarization model 122 uses an independent topic/category model $\beta(.)$, which probabilistically assigns each review $r_i$ to some set of relevant topics. That is to say, $\beta(r_i)_j$ is the probability that a review $r_i$ belongs to a topic $j$: $p(j|r_i) = \beta(r_i)_j$ for $j=1, \ldots, T$. A hierarchical latent variable structure captures relationships between products, reviews, and topics as shown in FIG. 2.

The per-category summarization model 122 defines three sets of latent variables to represent products, topics, and individual reviews. Each product (or group) is associated with a group latent variable g, which captures the semantic information for the group (e.g., for the group of user reviews for a given product). Within each product, each topic (indexed by j for $j=1, \ldots, T$) is associated with a topic latent variable $t_j$. Each topic latent variable (sometimes referred to as a "category-specific representation") conditions on g (e.g., the group latent variable representing semantic information for the plurality of input reviews/text descriptions), but focuses more on topic words and topical information; and hence, it captures common themes and opinions about the product for that topic. Accordingly, each topic latent variable may be a category-specific representation that represents words (and other information) of the plurality of reviews/text descriptions that are semantically associated with the specific category. Finally, each review $r_i$ ($i=1, \ldots, N$) is associated with a review latent code $z_i = [z_{ij}]_{j=1}^T$ (e.g., a review latent variable), which conditions on the topic representation and captures content of individual reviews. $z_{ij}$ denotes the review code for $r_i$ given a topic j. The topic distribution $\beta(r_i)$ is used to soft-gate $z_i$. The hierarchical generative process of the per-category summarization model 122 is as follows:

for each group
    sample group variable $g \sim \mathcal{N}(0, I)$
    for topic index $j=1, \ldots, T$
        sample topic variable $t_j \sim \mathcal{N}(\mu_\theta(g), I\sigma_\theta(g))$
    for review index $i=1, \ldots, N$
        for topic index $j=1, \ldots, T$
            sample review code $z_{ij} \sim \mathcal{N}(\mu^\theta(t_j), I\sigma_\theta(t_j))$
        sample review $r_i \sim p(r_i | \beta(r_i), z_i, r_{-i})$ The posterior inference of the per-category summarization model 122 is based on the variational autoencoder (VAE) model (Kingma and Welling, 2013), also used in the CopyCat summarization model (Bražinskas et al., 2020b). The encoder of the VAE produces the variational posterior distributions of the latent variables $g \sim q\phi(g | r_{1:N})$, $t_j \sim q_\phi(t_j |$ $r_{1:N}, [\beta(r_i)]_{i=1}^N, g)$, and $z_{ij} \sim q_\phi(z_{ij} | r_i, t_j)$. As shown in later sections, the variational posterior of $t_j$ depends on topic distributions $[\beta(r_i)]_{i=1}^N$ of all reviews in the group.

The decoder (e.g., a decoder network), parameterized by $\theta$, uses the posterior samples $z_i$ and $\beta(r_i)$ to reconstruct the review $r_i$. The reconstruction probability is defined as $p_\theta(r_i | \beta(r_i), z_i, r_{-i})$. Despite the fact that common factors of variation relating the review $r_i$ to other reviews in its group are conveyed to $z_i$ through g and $t = [t_j]$, the decoder needs more direct dependency on fine-grain common group details, such as product names, product-specific attributes, and characteristics. Hence, in various examples, the decoder is permitted access to other reviews in the group $r_{-i} = (r_1, \ldots, r_{i-1}, r_{i+1}, \ldots, r_N)$.

As described in further detail below, the trained model can generate a summary for a group of reviews for a given topic j by decoding the mean of the topic-dependent and review-agnostic $z_{*j}$ prior.

The full variational loss objective is:

$$\mathcal{L}_{VAE}(\theta, \phi, r_{1:N}) = \mathop{\mathbb{E}}_{g \sim q_\phi(g | r_{1:N})} \left[ \mathop{\mathbb{E}}_{t \sim q_\phi(t | r_{1:N}, [\beta(r_i)]_{i=1}^N, g)} \right($$

-continued $$\sum_{i=1}^{N} \mathbb{E}_{z_i \sim q_\phi(z_i|r_{i:N})} \left[ -\log p_\theta(r_i | z_i, \beta(r_i), r_{-i}) + \sum_{i=1}^{N} D_{KL}[q_\phi(z_i | r_i, t) \| p_\theta(z_i | t)] \right] +$$

$$D_{KL}[q_\phi(t | r_{1:N}, [\beta(r_i)]_{i=1}^{N}, g) \| p_\theta(t | g)] \right] + D_{KL}[q_\phi(g | r_{1:N}) \| p_\theta(g)].$$

The loss is the sum of the expected reconstruction loss and the expected KL terms, which regularize the variational posteriors of the latent variables by penalizing their deviation from the corresponding priors. The variational posteriors are defined as Gaussians with parameters given by a neural network, parameterized with $\phi$.

Figure 3:
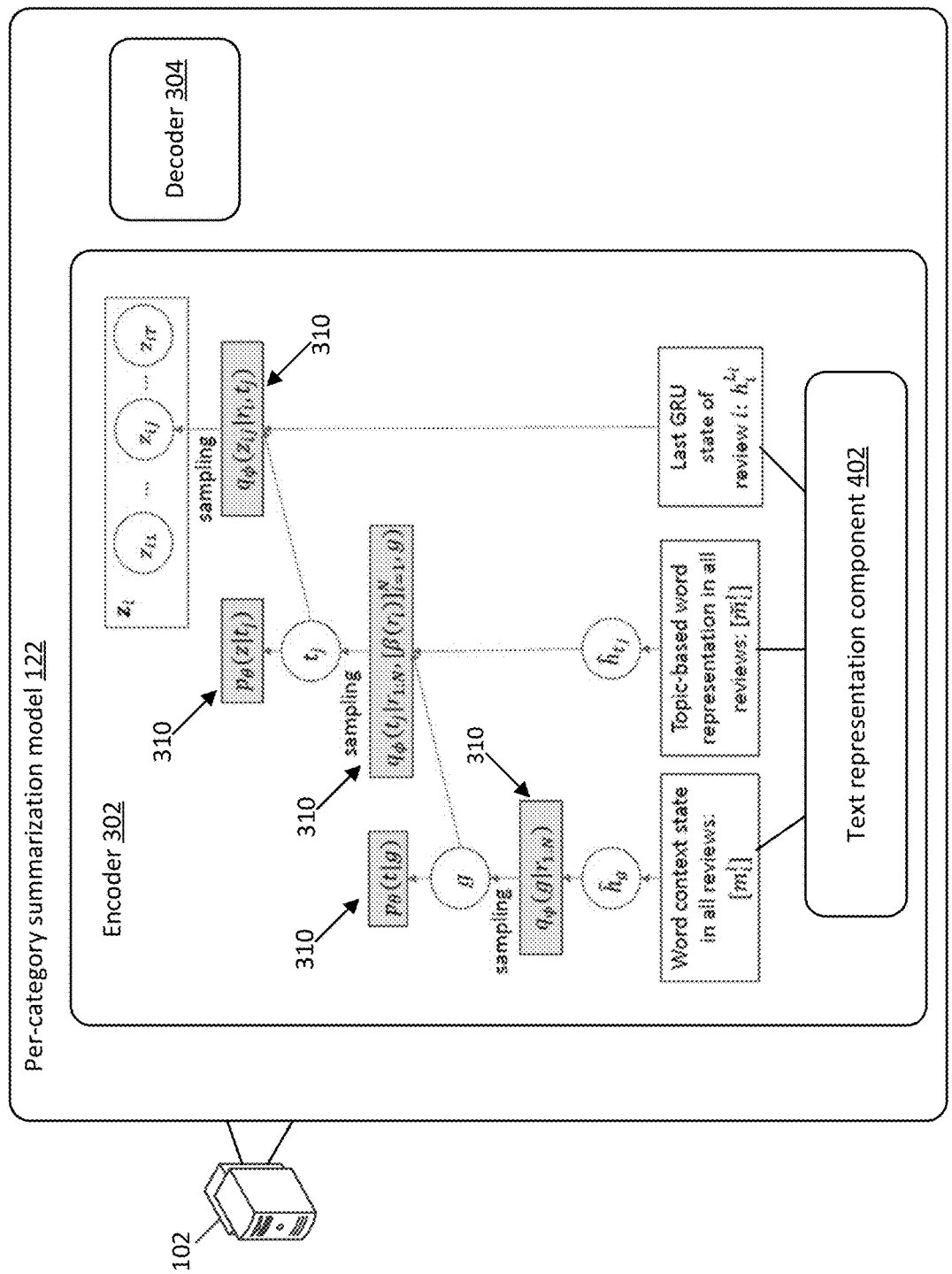
FIG. 3 depicts an example encoder of the per-category summarization model of FIG. 2, in accordance with various aspects of the present disclosure.

FIG. 3 depicts an example encoder 302 of the per-category summarization model 122, in accordance with various aspects of the present disclosure. FIG. 3 illustrates how the encoder 302 produces latent codes g, t, and $z_i$. As with standard VAE, Gaussian distributions are used with diagonal covariances for the prior and variational distributions. FIG. 3 illustrates generation of the latent code $z_i$ for a review $r_i$ by the encoder 302. Boxes 310 represent the neural networks that compute the prior and variational posterior distributions of latent codes.

Text Representation Component

Figure 4:
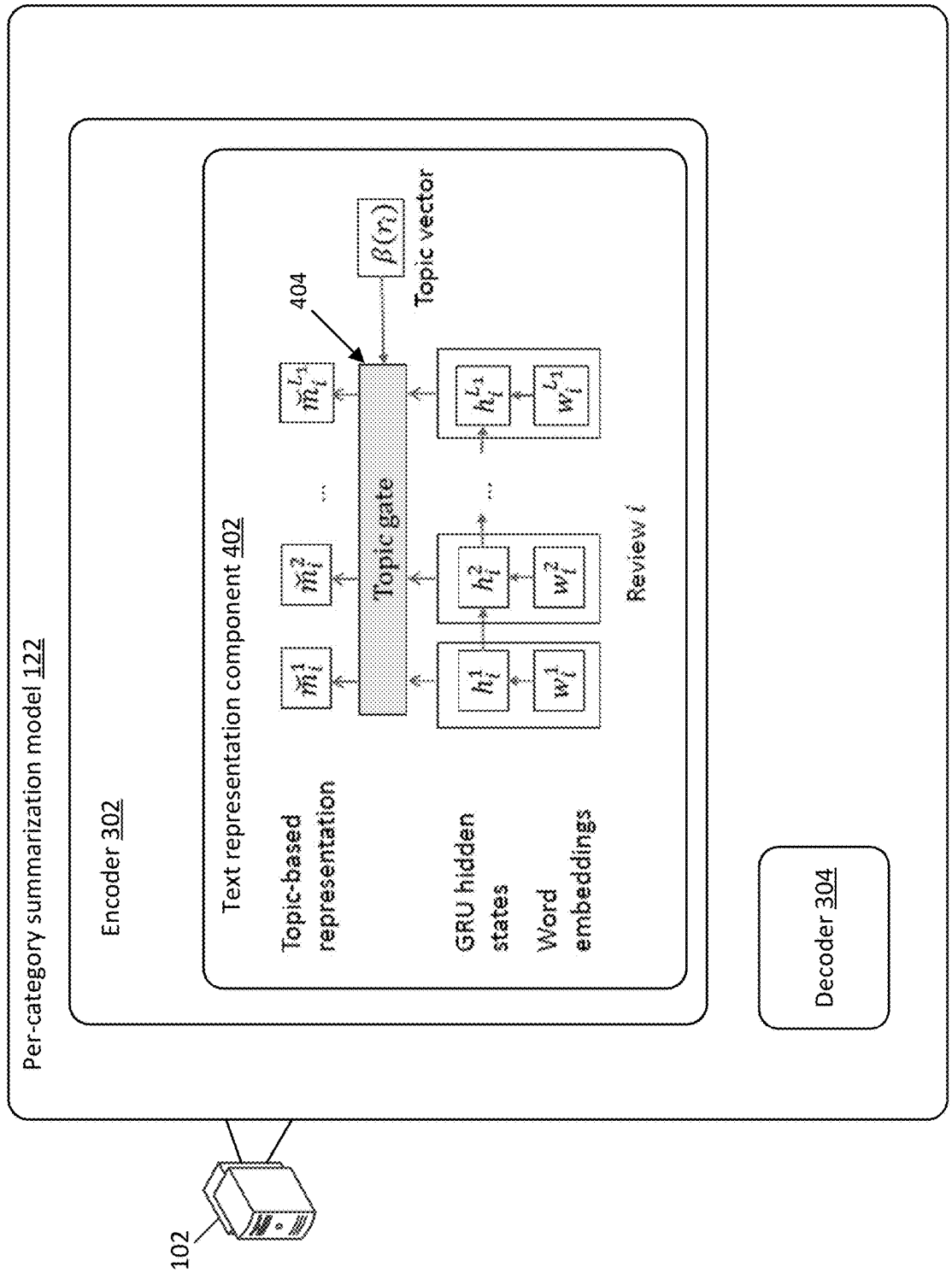
FIG. 4 depicts an example text representation component of the encoder of FIG. 3, in accordance with various aspects of the present disclosure.

The encoder 302 starts with a text representation component 402 which includes a word embedding unit, a GRU encoder (Cho et al., 2014), and a topic gate 404, as shown in FIG. 4. Words in reviews or other feedback data are embedded into word embeddings and then transformed by a GRU encoder to obtain hidden states. $L_i$ denotes the length of review $r_i$; $w_i^l$ and $h_i^l$ denote the word embedding and GRU hidden state, respectively, for the l-th word in review $r_i$, for l=1, ..., $L_i$. Word embeddings and GRU hidden states are concatenated into word context states: $m_i^l = [w_i^l \circ h_i^l]$. They are later used to compute group latent codes g.

Word context states are also fed to a topic gate 404 to generate a topic-based word representation, which attends more to words related to review topics. First, the concatenation of each word context state and the topic vector $\beta(r_i)$ of the review is fed to a feed-forward neural network (FFNN) with tanh non-linearity to give a topic influence vector for each word:

$$c_i^l = \tanh(W[m_i^l \circ \beta(r_i)] + b),$$

where $c_i^l$ has the same dimension as $m_i$. The topic-based word representation is then computed as $$\tilde{m}_i^l = m_i^l \odot c_i^l,$$

where $\odot$ is the element-wise multiplication operation. The topic-based word representations later contribute to the topic latent codes.

Distributions for Group Latent Codes g

The group latent code in the per-category summarization model 122 plays a similar role to that of the Copycat model, and its distributions are computed in a similar way. Its prior p(g) is set to the standard normal distribution. To compute the variational posterior $q_\phi(g|r_{1:N})$, the importance coefficient of each word in the review group is first computed. The importance coefficient of each word in the review group is $$\alpha_i^l = \frac{\exp(f_\phi^\alpha(m_i^l))}{\sum_{i'=1}^{N}\sum_{l'=1}^{L_{i'}} \exp(f_\phi^\alpha(m_{i'}^{l'}))},$$

for the l-th word in review $r_i$. Here, $f_\phi^\alpha$ is a 2-layer FFNN with tanh non-linearity, which takes as input the word context states and returns a scalar. The mean and log covariance of $q_\phi(g|r_{1:N})$ are then computed by separate affine projections of the intermediate group representation $\hat{h}_g$, which is the weighted sum of the word context states:

$$\hat{h}_g = \sum_{i=1}^{N}\sum_{l=1}^{L_i} \alpha_i^l m_i^l.$$

A latent code g can then be sampled from the above posterior distribution. The reparameterization trick (Kingma and Welling, 2013) is applied during sampling to allow back-propagation of the reconstruction error.

Distributions for Topic Latent Codes t

The prior for topic latent codes is conditioned on the common group latent code g and shared across different topics, i.e., $p_\theta(t_j|g) = \mathcal{N}(t_j; \mu_\theta(g), \sigma_\theta(g)I)$ for j=1, ..., T, where the mean and log covariance are computed as a linear transformation of g.

The variational posterior for latent code $t_j$ of each topic j depends on the common group code g, reviews $r_{1:N}$, and topic probabilities $[\beta(r_i)]_{i=1}^{N}$, i.e., $q_\phi(t_j|r_{1:N}, [\beta(r_i)]_{i=1}^{N}, g) = \mathcal{N}(\mu_\phi(r_{1:N}, [\beta(r_i)]_{i=1}^{N}, g), \sigma_\phi(r_{1:N}, [\beta(r_i)]_{i=1}^{N}, g)I)$. To compute this posterior of $t_j$, the importance coefficient of each word in each review to the topic representation $t_j$ is first computed. However, the topic-based word representations are used instead of word context states as in g:

$$\tilde{\alpha}_{ji}^l = \frac{\exp(f_\phi^{\tilde{\alpha}}(\tilde{m}_i^l))}{\sum_{i'=1}^{N}\sum_{l'=1}^{L_{i'}} \exp(f_\phi^{\tilde{\alpha}}(\tilde{m}_{i'}^{l'}))}$$

The intermediate topic representation $$\hat{h}_{t_j} = \sum_{i=1}^{N}\sum_{l'=1}^{L_{i'}} \tilde{\alpha}_{ji}^l \tilde{m}_i^l$$

is then computed. The computation of $\hat{h}_{t_j}$ can be viewed as a two-layer filter mechanism. First, the topic gate pays attention to key words related to topics of each review. Then, among those key words from different reviews, the importance coefficients an $\tilde{\alpha}_{ji}^l$ pay attention to those related to the topic j of interest.

Finally, affine transformations are applied on the concatenation of $\hat{h}_{t_j}$ and g to give the mean and log variance of the variational posterior for $t_j$. A latent code $t_j$ is sampled from this posterior and an assembled code $t = [t_j]_{j=1}^{T}$ is generated.

Distributions for Review Latent Codes $z_i$

The prior on the review code $z_{ij}$ corresponding to review $r_i$ and topic j is conditioned on the topic code $t_j$ and is shared across different reviews, i.e. $p_\theta(z_{ij}|t_j) = \mathcal{N}(z_{ij}; \mu_\theta(t_j), \sigma_\theta(t_j)I)$ for j=1, ..., T, where the mean and log covariance are computed as a linear transformation of $t_j$. To compute the mean and log covariance of variational posterior $q_\phi(z_{ij}|r_i, t_j)$, an affine transformation is performed on the concatenation of $h_i^{L_i}$ and $t_j$. $z_i = [z_{ij}]_{j=1}^{T}$ is then sampled from these posteriors.

Decoder

The decoder 304 reconstructs the original reviews by computing the distribution $p_\theta(r_i|z_i, \beta(r_i), r_{-i})$. First, the aggregated latent code $\hat{z}_i$ for each review $r_i$ can be computed as:

$$\hat{z}_i = \sum_{j=1}^{N} \beta(r_i)_j z_{ij}.$$

After that, the structure of CopyCat's decoder may be followed (Bražinskas et al., 2020b). The decoder takes $\hat{z}_i$ and $r_{-i}$ as input and computes $p_\theta(r_i|\hat{z}_i, r_{-i})$. An auto-regressive GRU decoder may be used with the attention mechanism and a pointer generator network.

The decoder 304 GRU's hidden state $s_i^t$ at time step t is computed from the previous hidden state $s_i^{t-1}$ and the concatenated vector $[w_i^t \circ \hat{z}_i \circ c_i^{t-1}]$, where $c_i^{t-1}$ is the context vector from the previous time step. Here, $c_i^t = \text{att}(s_i^t, h^{-i})$ is computed by attending to all the encoder 302's hidden states $h_{-i}$ of other reviews $r_{-i}$, using $s_i^t$ as a query. The word distributions in the reconstructed review are then computed using the pointer-generator network.

Loyalty Term

The VAE lower bound in the full variational loss objective equation focuses on reconstructing a review $r_i$ from its latent representation and other reviews $r_{-i}$ of the same group. Because reviews may vary largely, and it is not always possible to reconstruct a review from other reviews, the decoder tends to be creative, and inclines toward generating a new word, instead of copying a word from other reviews. As a result, the generated summaries at test phase often contain many new words and possibly false information that is not present in original reviews. To remedy this problem, a loyalty term $\mathcal{L}_0$ is added that encourages assigning the probability mass to words that appear in $r_{-i}$:

$$\mathcal{L}_0(\theta, \phi, r_{1:N}) = \mathbb{E}_{g \sim q_\phi(g|r_{1:N})} \mathbb{E}_{t \sim q_\phi(t|r_{1:N}, [\beta(r_i)]_{i=1}^{N}, g)}$$

$$\left( \sum_{i=1}^{N} \mathbb{E}_{z_i \sim q_\phi(z_i|r_i, t)} \left[ \sum_{l=1}^{L_i} \sum_{w \in V(r_{-i})} -p_\theta(w | z_i, \beta(r_i), r_{-i}, r_i^{1:l-1}) \right] \right),$$

where $V(r_{-i})$ is the vocabulary of all words in $r_{-i}$. The final loss function is computed as $$\mathcal{L} = \mathcal{L}_{VAE} + \alpha * \mathcal{L}_0$$

where $\alpha$ is the trade-off hyperparameter. $\mathcal{L}$ is minimized with respect to both the inference network's parameter $\phi$ and the generative network's parameter $\theta$.

Summary Generation

At test time, a summary per category/topic for a new group of reviews $r_{1:N}$ may be generated. This is equivalent to generating a new review that reflects common information from the reviews $r_{1:N}$. To do so, the latent variables are fixed to their respective means. The steps to generate a summary $r_*$ for a topic j from a group of reviews $r_{1:N}$ are as follows:

1. Fix g at the mean of its posterior $q_\phi(g|r_{1:N})$
2. Fix $t_j$ at the mean of its posterior $q_\phi(t_j|r_{1:N}, [\beta(r_i)]_{i=1}^{N}, g)$.
3. Fix $z_{*j}$ at the mean of its prior $p_\theta(z_{*j}|t_j)$.
4. Assign $\hat{z}_* = z_{*j}$, and compute the decoder's probability for $r_*$: $p_\theta(r_*|\hat{z}_*, r_{1:N})$. In various examples, if the probability that at least some of the plurality of reviews (or other text descriptions) relate to a particular category is less than a threshold probability, no summary may be generated for the particular category.

Figure 5:
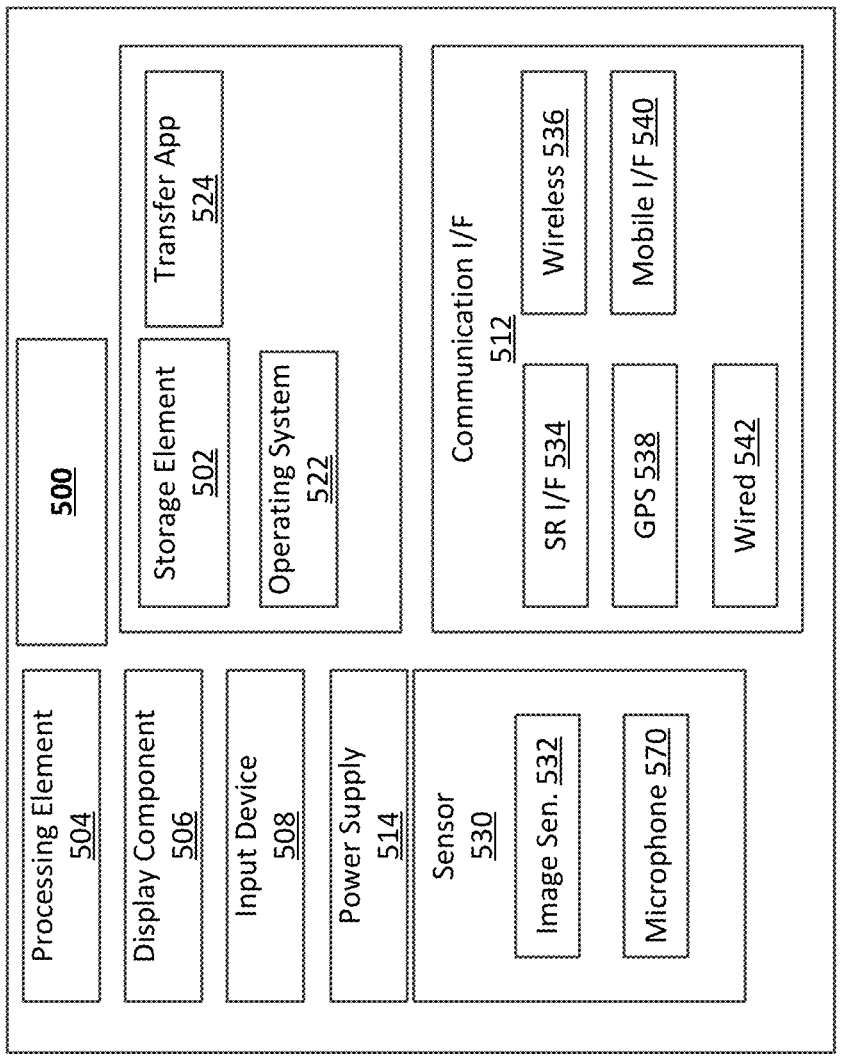
FIG. 5 is a block diagram showing an example architecture of a computing device that may be used in accordance with various embodiments described herein.

FIG. 5 is a block diagram showing an example architecture 500 of a computing device that may be used to generate per-category summaries, in accordance with various aspects of the present disclosure. It will be appreciated that not all devices will include all of the components of the architecture 500 and some user devices may include additional components not shown in the architecture 500. The architecture 500 may include one or more processing elements 504 for executing instructions and retrieving data stored in a storage element 502. The processing element 504 may comprise at least one processor. Any suitable processor or processors may be used. For example, the processing element 504 may comprise one or more digital signal processors (DSPs). The storage element 502 can include one or more different types of memory, data storage, or computer-readable storage media devoted to different purposes within the architecture 500. For example, the storage element 502 may comprise flash memory, random-access memory, disk-based storage, etc. Different portions of the storage element 502, for example, may be used for program instructions for execution by the processing element 504, storage of images or other digital works, and/or a removable storage for transferring data to other devices, etc. Additionally, storage element 502 may store parameters, and/or machine learning models generated using the various techniques described herein.

The storage element 502 may also store software for execution by the processing element 504. An operating system 522 may provide the user with an interface for operating the computing device and may facilitate communications and commands between applications executing on the architecture 500 and various hardware thereof. A transfer application 524 may be configured to receive images, audio, and/or video from another device (e.g., a mobile device, image capture device, and/or display device) or from an image sensor 532 and/or microphone 570 included in the architecture 500.

When implemented in some user devices, the architecture 500 may also comprise a display component 506. The display component 506 may comprise one or more light-emitting diodes (LEDs) or other suitable display lamps. Also, in some examples, the display component 506 may comprise, for example, one or more devices such as cathode ray tubes (CRTs), liquid-crystal display (LCD) screens, gas plasma-based flat panel displays, LCD projectors, raster projectors, infrared projectors or other types of display devices, etc. As described herein, display component 506 may be effective to display the various fields and/or GUIs described herein.

The architecture 500 may also include one or more input devices 508 operable to receive inputs from a user. The input devices 508 can include, for example, a push button, touch pad, touch screen, wheel, joystick, keyboard, mouse, trackball, keypad, light gun, game controller, or any other such device or element whereby a user can provide inputs to the architecture 500. These input devices 508 may be incorporated into the architecture 500 or operably coupled to the architecture 500 via wired or wireless interface. In some examples, architecture 500 may include a microphone 570 or an array of microphones for capturing sounds, such as voice requests. In various examples, audio captured by microphone 570 may be streamed to external computing devices via communication interface 512.

When the display component 506 includes a touch-sensitive display, the input devices 508 can include a touch sensor that operates in conjunction with the display component 506 to permit users to interact with the image displayed by the display component 506 using touch inputs (e.g., with a finger or stylus). The architecture 500 may also include a power supply 514, such as a wired alternating current (AC) converter, a rechargeable battery operable to be recharged through conventional plug-in approaches, or through other approaches such as capacitive or inductive charging.

The communication interface 512 may comprise one or more wired or wireless components operable to communicate with one or more other computing devices. For example, the communication interface 512 may comprise a wireless communication module 536 configured to communicate on a network, such as the network 104, according to any suitable wireless protocol, such as IEEE 802.11 or another suitable wireless local area network (WLAN) protocol. A short range interface 534 may be configured to communicate using one or more short range wireless protocols such as, for example, near field communications (NFC), Bluetooth, Bluetooth LE, etc. A mobile interface 540 may be configured to communicate utilizing a cellular or other mobile protocol. A Global Positioning System (GPS) interface 538 may be in communication with one or more earth-orbiting satellites or other suitable position-determining systems to identify a position of the architecture 500. A wired communication module 542 may be configured to communicate according to the USB protocol or any other suitable protocol.

The architecture 500 may also include one or more sensors 530 such as, for example, one or more position sensors, image sensors, and/or motion sensors. An image sensor 532 is shown in FIG. 5. Some examples of the architecture 500 may include multiple image sensors 532. For example, a panoramic camera system may comprise multiple image sensors 532 resulting in multiple images and/or video frames that may be stitched and may be blended to form a seamless panoramic output. An example of an image sensor 532 may be a camera configured to capture color information, image geometry information, and/or ambient light information.

As noted above, multiple devices may be employed in a single system. In such a multi-device system, each of the devices may include different components for performing different aspects of the system's processing. The multiple devices may include overlapping components. The components of the computing devices, as described herein, are exemplary, and may be located as a stand-alone device or may be included, in whole or in part, as a component of a larger device or system.

Figure 6:
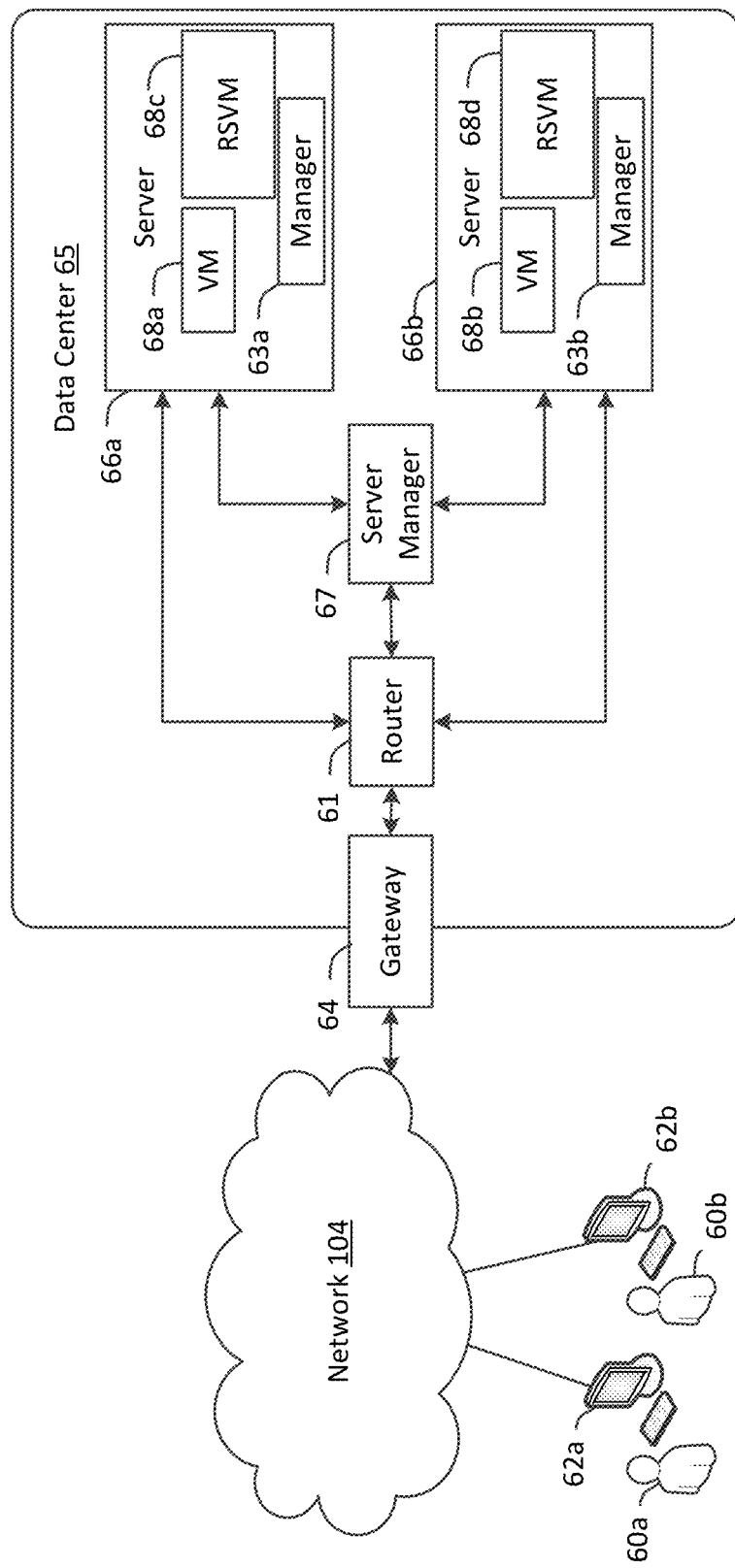
FIG. 6 is a diagram illustrating an example system for sending and providing data that may be used in accordance with the present disclosure.

An example system for sending and providing data will now be described in detail. In particular, FIG. 6 illustrates an example computing environment in which the embodiments described herein may be implemented. For example, the computing environment of FIG. 6 may be used to provide the various machine learning models described herein as a service over a network wherein one or more of the techniques described herein may be requested by a first computing device and may be performed by a different computing device configured in communication with the first computing device over a network. FIG. 6 is a diagram schematically illustrating an example of a data center 65 that can provide computing resources to users 60a and 60b (which may be referred herein singularly as user 60 or in the plural as users 60) via user computers 62a and 62b (which may be referred herein singularly as user computer 62 or in the plural as user computers 62) via network 104. Data center 65 may be configured to provide computing resources for executing applications on a permanent or an as-needed basis. The computing resources provided by data center 65 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services, and the like. In various examples, the instances may be configured to execute one or more of the various machine learning techniques described herein.

These services may be configurable with set or custom applications and may be configurable in size, execution, cost, latency, type, duration, accessibility, and in any other dimension. These web services may be configured as available infrastructure for one or more clients and can include one or more applications configured as a system or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 65 may include servers 66a and 66b (which may be referred herein singularly as server 66 or in the plural as servers 66) that provide computing resources. These resources may be available as bare metal resources or as virtual machine instances 68a-d (which may be referred herein singularly as virtual machine instance 68 or in the plural as virtual machine instances 68). In at least some examples, server manager 67 may control operation of and/or maintain servers 66. Virtual machine instances 68c and 68d are rendition switching virtual machine ("RSVM") instances. The RSVM virtual machine instances 68c and 68d may be configured to perform all, or any portion, of the techniques for improved rendition switching and/or any other of the disclosed techniques in accordance with the present disclosure and described in detail above. As should be appreciated, while the particular example illustrated in FIG. 6 includes one RSVM virtual machine in each server, this is merely an example. A server may include more than one RSVM virtual machine or may not include any RSVM virtual machines.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 6, network 104 may, for example, be a publicly accessible network of linked networks and possibly operated by various distinct parties, such as the Internet. In other embodiments, network 104 may be a private network, such as a corporate or university network that is wholly or partially inaccessible to non-privileged users. In still other embodiments, network 104 may include one or more private networks with access to and/or from the Internet.

Network 104 may provide access to user computers 62. User computers 62 may be computers utilized by users 60 or other customers of data center 65. For instance, user computer 62*a* or 62*b* may be a server, a desktop or laptop personal computer, a tablet computer, a wireless telephone, a personal digital assistant (PDA), an e-book reader, a game console, a set-top box, or any other computing device capable of accessing data center 65. User computer 62*a* or 62*b* may connect directly to the Internet (e.g., via a cable modem or a Digital Subscriber Line (DSL)). Although only two user computers 62*a* and 62*b* are depicted, it should be appreciated that there may be multiple user computers.

User computers 62 may also be utilized to configure aspects of the computing resources provided by data center 65. In this regard, data center 65 might provide a gateway or web interface through which aspects of its operation may be configured through the use of a web browser application program executing on user computer 62. Alternately, a stand-alone application program executing on user computer 62 might access an application programming interface (API) exposed by data center 65 for performing the configuration operations. Other mechanisms for configuring the operation of various web services available at data center 65 might also be utilized.

Servers 66 shown in FIG. 6 may be servers configured appropriately for providing the computing resources described above and may provide computing resources for executing one or more web services and/or applications. In one embodiment, the computing resources may be virtual machine instances 68. In the example of virtual machine instances, each of the servers 66 may be configured to execute an instance manager 63*a* or 63*b* (which may be referred herein singularly as instance manager 63 or in the plural as instance managers 63) capable of executing the virtual machine instances 68. The instance managers 63 may be a virtual machine monitor (VMM) or another type of program configured to enable the execution of virtual machine instances 68 on server 66, for example. As discussed above, each of the virtual machine instances 68 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 65 shown in FIG. 6, a router 61 may be utilized to interconnect the servers 66*a* and 66*b*. Router 61 may also be connected to gateway 64, which is connected to network 104. Router 61 may be connected to one or more load balancers, and alone or in combination may manage communications within networks in data center 65, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 65 shown in FIG. 6, a data center 65 is also employed, at least in part, to direct various communications to, from, and/or between servers 66*a* and 66*b*. While FIG. 6 depicts router 61 positioned between gateway 64 and data center 65, this is merely an exemplary configuration. In some cases, for example, data center 65 may be positioned between gateway 64 and router 61. Data center 65 may, in some cases, examine portions of incoming communications from user computers 62 to determine one or more appropriate servers 66 to receive and/or process the incoming communications. Data center 65 may determine appropriate servers to receive and/or process the incoming communications based on factors such as an identity, location, or other attributes associated with user computers 62, a nature of a task with which the communications are associated, a priority of a task with which the communications are associated, a duration of a task with which the communications are associated, a size and/or estimated resource usage of a task with which the communications are associated and many other factors. Data center 65 may, for example, collect or otherwise have access to state information and other information associated with various tasks in order to, for example, assist in managing communications and other operations associated with such tasks.

It should be appreciated that the network topology illustrated in FIG. 6 has been greatly simplified and that many more networks and networking devices may be utilized to interconnect the various computing systems disclosed herein. These network topologies and devices should be apparent to those skilled in the art.

It should also be appreciated that data center 65 described in FIG. 6 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders), and various other consumer products that include appropriate communication capabilities.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, used to implement and distribute the infrastructure and web services offered by the provider network. The resources may, in some embodiments, be offered to clients in various units related to the web service, such as an amount of storage capacity for storage, processing capability for processing, as instances, as sets of related services, and the like. A virtual computing instance may, for example, comprise one or more servers with a specified computational capacity (which may be specified by indicating the type and number of CPUs, the main memory size and so on) and a specified software stack (e.g., a particular version of an operating system, which may, in turn, run on top of a hypervisor).

A number of different types of computing devices may be used singly or in combination to implement the resources of the provider network in different embodiments, for example computer servers, storage devices, network devices, and the like. In some embodiments, a client or user may be provided direct access to a resource instance, e.g., by giving a user an administrator login and password. In other embodiments, the provider network operator may allow clients to specify execution requirements for specified client applications and schedule execution of the applications on behalf of the client on execution systems (such as application server instances, Java™ virtual machines (JVMs), general-purpose or special-purpose operating systems that support various interpreted or compiled programming languages such as Ruby, Perl, Python, C, C++, and the like, or high-performance computing systems) suitable for the applications, without, for example, requiring the client to access an instance or an execution system directly. A given execution system may utilize one or more resource instances in some implementations; in other implementations, multiple execution systems may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources, and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware system, a virtual machine instance executing on a server or some combination of the two. Various types and configurations of instances may be made available, including different sizes of resources executing different operating systems (OS) and/or hypervisors, and with various installed software applications, runtimes, and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments, the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations, inexpensive and low latency network connectivity may be provided between resource instances that reside within the same geographical region (and network transmissions between resources of the same availability zone may be even faster).

Figure 7:
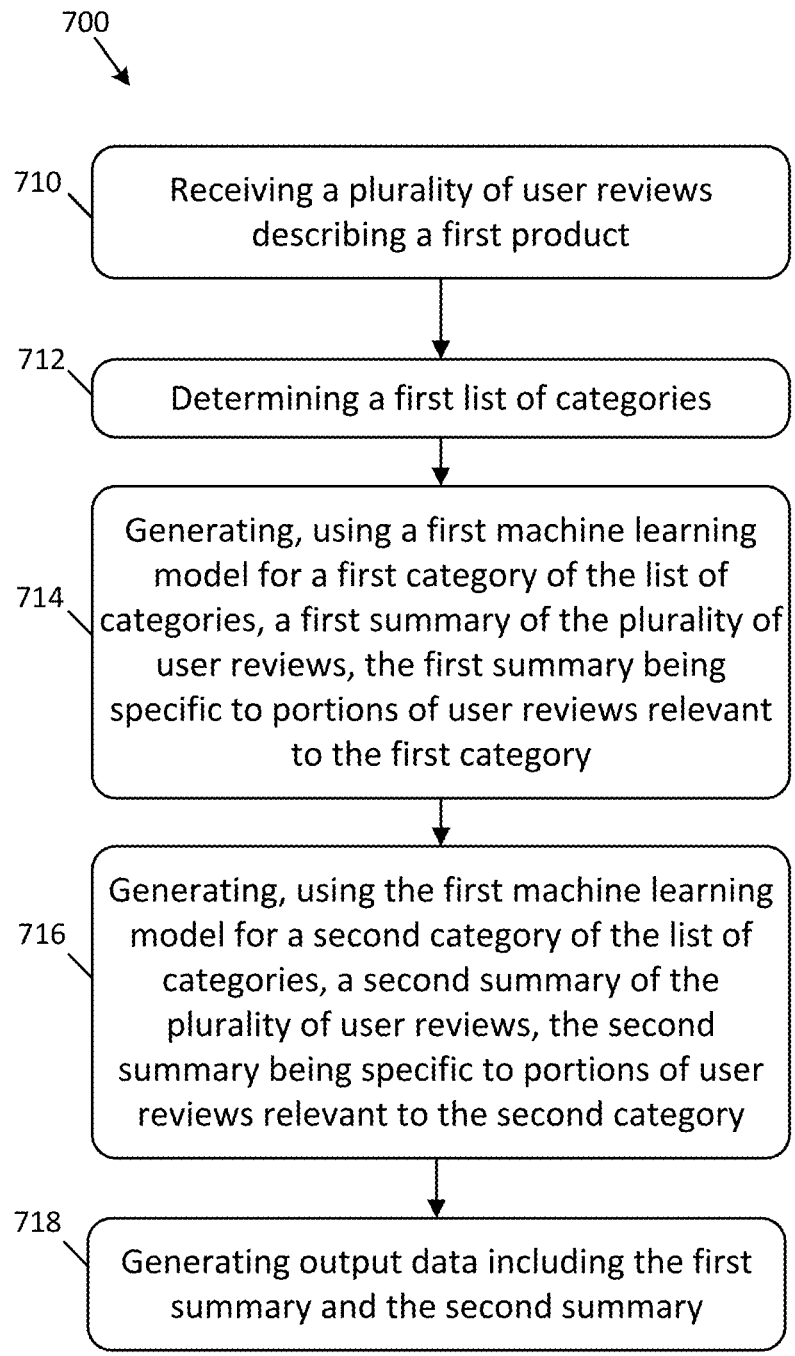
FIG. 7 depicts an example process for generating per-category feedback summaries, in accordance with various aspects of the present disclosure.

FIG. 7 depicts an example process 700 for generating per-category feedback summaries, in accordance with various aspects of the present disclosure. Those portions of FIG. 7 that have been previously discussed in reference to FIGS. 1-6 may not be described again for purposes of clarity and brevity. The actions of the process 700 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure.

Processing may begin at action 710, at which a plurality of user reviews describing a first product. At action 710, text data comprising a plurality of different user reviews for a given product may be received. Processing may continue to action 712, at which a first list of categories may be determined. In some examples, the list of categories may be provided (e.g., a list of business concerns such as "product defects," "safety concerns," "customer satisfaction," etc.). In other examples, the categories may be learned using a black box classifier and/or a topic modeling algorithm. In such cases, a human evaluator may label the different categories determined by the classifier and/or topic modeling algorithm.

Processing may continue at action 714, at which a first machine learning model may generate, for a first category of the list of categories, a first summary of the plurality of user reviews. In some examples, the first summary may be specific to portions of user reviews relevant to the first category. For example, the first category may relate to product safety. The various machine learning techniques described herein may be used to generate a summary of the portions of the plurality of user reviews received at action 710 that relate to product safety.

Processing may continue at action 716, at which the first machine learning model may generate, for a second category of the list of categories, a second summary of the plurality of user reviews. In some examples, the second summary may be specific to portions of user reviews relevant to the second category. For example, the second category may relate to product quality. The various machine learning techniques described herein may be used to generate a summary of the portions of the plurality of user reviews received at action 710 that relate to product quality.

Processing may continue at action 718, at which output data may be generated that includes the first summary and the second summary. In various examples, the output data may be output via a data visualization user interface that displays the respective summaries as labeled with their categories. For example, a user investigating customer feedback may click on various different categories (e.g., Product Safety, Product Quality, Product Cost, etc.) to receive an automatically-generated summary of the portions of user reviews associated with that product that pertain to the particular category selected.

Extractive Class-Aware Phrasal Insights

An unsupervised heuristic algorithm for generating extractive class-aware phrasal insights for feedback data (e.g., user reviews) is described herein. In various examples, the algorithm uses several pre-trained ML models, for candidate insight extraction, representation, and scoring. The input to the extractive class-aware phrasal insight algorithm is a collection of related feedback text, such as product reviews corresponding to the same product.

For the first step of candidate insight extraction, a dependency parsing model is used to extract phrases and clauses that satisfy the requirements of an insight—phrase-length coherent and grammatically partitioned text fragments. Additionally, since a constraint is that the insights make sense in the context of domain and task specific categories of feedback, an existing reference classifier f may be used to score the salience of a given candidate insight to each of the target categories. An optimal subset of candidate insights is selected that attempts to maximize the total salience score for the selection, while simultaneously minimizing the semantic overlap between the insights.

The above described approach generates phrase-length insights (e.g., extractive summary phrases) that are as distinct and non-redundant as possible. Different approaches are possible for measurement of the semantic overlap and self-similarity of the insight selection. For example, a direct ROUGE-metric-based assessment of overlap between each pair of insights may be used or a pre-trained SOTA Sentence-BERT model may be used to embed each insight, allowing for computation of pairwise semantic distances for the entire selection.

In various examples, a pre-trained Spacy dependency parser may be applied on each sentence to produce the dependency tree for the parsed sentence. Each node in a dependency tree (DT) corresponds to a sentence token, and the parent-child links represent dependency relationships.

TABLE 1

Semantic similarity measures.

| Approach | Function |
| --- | --- |
| ROGUT-W | $s_{rouge}(a, b) = \frac{1}{2}(\text{rouge}W_{f1}(a, b) + \text{rouge}W_{f1}(b, a))$ |
| Sentence-BERT | $s_{SentBERT}(a, b; \sigma) = e^{-\sigma\|embedSentBERT(a) - embedSentBERT(b)\|^2}$ |

The general algorithm to separate the various phrases and clauses contained in a sentence begins at the root (e.g., the main verb in the sentence), and follows the dependencies down to build up the output phrases. There is a distinction between required dependencies, e.g. aux, needed for well-formed and complete phrases, and optional ones, e.g. poss, which may be either followed or skipped, and which provide the means to derive several related sibling phrases. Special anchor words, which are either verbs, nouns, or adjectives, which can form the roots of noun-phrases, verb phrases, or adjective phrases, may be accounted for and compiled.

Scoring Each Insight

Given a reference classifier f(d), which takes as input a text string d and produces a vector of conditional class probabilities p(Y=y|d), where y∈{1 . . . n}, the salience score for each phrase/clause in the candidate insights set is generated as $r(p, \Lambda) = \Sigma_{y \in \Lambda} p(Y=y|p)$, where A is a subset of classes of interest or prominence. For instance, in the case of listing return comments, the 3 most prominent classes for the entire listing may be considered, rather than each individual comment. Alternatively, the insights may be scored into any class above a certain probability threshold. A may be one of the hyper-parameters that is tunable for a specific domain and/or use-case.

Semantic Insight Similarity Function

As previously described, rather than only focusing on maximizing the total salience of the selected insights, the various techniques described herein ensure that the insights are distinct and non-overlapping. To simplify balancing these two objectives, a semantic similarity measure in the range [0, 1] is generated. One of two measures of semantic overlap or similarity may be used for every pair of candidate insights.

The first measure uses the ROUGE-W metric, which is applied twice and averaged, once as rougeW (a, b) and another time as rougeW (b, a), for each pair a, b of candidate insights. All ROUGE-based metrics provide precision, recall, and F1 statistics based on the identified fragment overlaps, of which only the F1 score may be used. The choice of using ROUGE-W, as opposed to other ROUGE variants, is that it better captures the semantic similarity rather than simple n-gram overlap. This is because its statistics are based on identified longest common sub-sequences, which, unlike longest common sub-strings, are not required to occupy consecutive positions. However, unlike ROUGE-L, ROUGE-W gives higher weight to consecutively-placed longest common subsequences.

The second approach is based on direct semantic embedding of candidate insights. We use the Sentence-BERT model, pre-trained using the RoBERTa pre-training approach. This pre-trained model has been shown to achieve SOTA quality of embedding based upon comparisons against benchmarks on Semantic Textual Similarity tasks. After embedding each insight, the RBF kernel similarity function may be computed in the embedding space, parameterized with the RBF scale hyper-parameter.

Greedy Optimal Insight Subset Selection

The problem of optimal selection of insights can be formulated as an Integer Programming problem, in which binary variables $x_i$ are used, one for each insight in the candidate set, with 1 signifying inclusion of the insight into the optimal subset and 0 its exclusion. The formal objective, defined below, seeks to maximize the total salience of the selected insights, whilst minimizing the self-similarity or overlap between them. P is used as the set of all candidate insights extracted using the dependency parsing based algorithm and scored using the scoring function r( ) mentioned previously.

The function $s(p_i, p_j)$ is the pairwise similarity measure for two text strings, using one of the two approaches presented in the previous subsection. Finally, the hyper-parameter $\lambda$ provides balance between the two adversarial goals of the objective.

$$\arg\max_{x} \sum_{i}^{|P|} x_i r(p_i, \Lambda) - \lambda \max_{\substack{i,j=1\ldots|P| \\ x_i,x_j=1}} s(p_i, p_j)$$

Note that instead of using mean to measure the overall self-similarity of the selected insights, the maximum is determined. The reasoning is that the overall distinctiveness of the selected insights is as good as the distinctiveness of its most similar pair. This is akin to using single-linkage agglomerative clustering rather than the average-linkage kind.

Maximizing the above objective directly using Integer Programming techniques poses significant challenges due to non-convexity of the second term. Due to this, a much simpler greedy approach may be used, outlined in the algorithm below:

Input: P: set of scored candidate insights (phrases & clauses.)
Hyper-parameters: $\Lambda$: categories of interest for the summarization task,
  s(a, b): semantic similarity function, such as one of the ones described -continued $\sigma$: hyper-parameter of the Sentene-BERT similarity function,
$\lambda$: penalty weight on semantic similarity within the subset.
Output: I: optimized subset of P
I = Ø;
$p^* = \underset{p \in P}{\mathrm{argmax}}\ r(p, \Lambda)$;
I.insert(p*);
P.remove(p*);
totalSalience = r(p*, $\Lambda$);
maxSimilarity = 0;
white True do
| $p^* = \underset{p \in P}{\arg\max}\left[r(p, \Lambda) - \lambda \max_{q \in I} s(p, q)\right]$;
| $newMaxSimilarity = \max\left[maxSimilarity, \max_{q \in I} s(p^*, q)\right]$;
| newTotalSalience = totalSalience + r(p*, $\Lambda$);
| if newTotalSalience – $\Lambda$ newMaxSiliarity > totalSalience – $\Lambda$ maxSimilarity
|   then
|   | total Salience = newTotalSalience;
|   | maxSimilarity = newMaxSimilarity;
|   | I.insert(p*);
|   | P.remove(p*);
|   | if P = Ø then
|   |   | break;
|   | end
| else
|   | break;
| end
end The algorithm initializes the optimal insights subset by picking the most salient insight first. After this, during each iteration it finds the best candidate insight to add to the selection, which is the insight with the maximum score, composed of its salience minus the scalar multiple of the highest similarity to the insights already selected. Phrased more simply, the insight is selected that balances high salience with sufficiently low similarity to the insights already selected. Before adding this best candidate, a check is performed to ensure that adding it to I increases the target objective (1). If not, a determination may be made that the solution has converged to the local greedy maximum, and the algorithm may be terminated.

The tables below illustrate sample listings and extractive phrase insights generated using the various techniques described above.

TABLE 2

Sample listings chosen for demonstration of the test approaches.

| Listing 1 | Listing 2 | Listing 3 |
|---|---|---|
| I received the product with a broken spoon. The included spoon is broken. glass is shattered. Came with parts of the lids broken. Spoons were broke. too hard to open the lid. Too high. it didn't fix my. one of the spoons is cracked. One of the spoons is broken. One of the canisters arrived broken, very bad packaging. | Too long. looks like damage in making the curtains. machine done. One curtain shorter than the other. thought there were two panels, not just one. Does not block out light well. no dark enough. wrong size. Returning 2 panels since the Rod i ordered is damaged; curtains have 2 panels each so this is a related return. Color is purple, not grey. Description says the curtains are grey, but they look purple/blue. | Does not fit my charge 2 fitbit. The side of the strap comes off easily. The color looks online as if its different than the gold, however its almost exactly the same. I wanted two different colors. Magnet isn't attached to band. This looked more white on the website, but when received was actually yellow gold. Would prefer to reorder in the gold being my charge 3 is gold. Will not correctly fit my fitbit. Darker than the picture showed. color is brown, not silver as shown. Does not stay attached to the fitbit. Magnet doesnt hold well. |

TABLE 3

Output Insights produced by the three versions of our approach.

| Listing | NoGreedy | Greedy BERT | GreedyROUGE |
|---|---|---|---|
| 1 | Came with parts of the lids broken<br>One of the canisters arrived broken<br>One of the spoons is broken<br>I received the product with a broken spoon<br>The included spoon is broken<br>one of the spoons is cracked<br>Spoons were broke<br>glass is shattered<br>very bad packaging | Came with parts of the lids broken<br>very bad packaging<br>I received the product with a broken spoon<br>too hard to open the lid<br>one of the spoons is cracked | glass is shattered<br>One of the canisters arrived broken<br>I received the product with a broken spoon<br>very bad packaging<br>Spoons were broke<br>Came with parts of the lids broken<br>one of the spoons is cracked<br>it didn't fix my<br>Too high |
| 2 | Description says the curtains are grey<br>they look purple/blue<br>looks like damage in making the curtains<br>Color is purple<br>no dark enough<br>Returning 2 panels since the Rod I ordered is damaged; curtains have 2 panels each so this is a related return<br>not grey | Description says the curtains are grey<br>Too long<br>not block out light well<br>no dark enough | Description says the curtains are grey<br>Color is purple<br>no dark enough<br>they look purple / blue<br>thought there were two panels<br>not block out light well<br>machine done<br>Too long<br>wrong size |
| 3 | The color looks online as if its different than the gold<br>Darker than the picture showed<br>This looked more white on the website<br>color is brown<br>I wanted two different colors<br>not silver as shown<br>when received was actually yellow gold<br>prefer to reorder in the gold being my charge 3 is gold | The color looks online as if its different than the gold<br>The side of the strap comes off easily<br>Magnet does nt hold well<br>not fit my charge 2 fitbit<br>Darker than the picture showed | The color looks online as if its different than the gold<br>color is brown<br>This looked more white on the website<br>Darker than the picture showed when received was actually yellow gold<br>prefer to reorder in the gold being my charge 3 is gold<br>Magnet does nt hold well |

Although various systems described herein may be embodied in software or code executed by general-purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. In addition, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the non-transitory, computer-readable medium and executed by the instruction execution system. In the context of the present disclosure, a "non-transitory computer-readable medium" can be any medium that can contain, store, or maintain the logic or application described herein for use by or in connection with the instruction execution system. The non-transitory computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A computer-implemented method of generating review summaries, comprising:
   receiving a plurality of user reviews describing a first product;
   determining a first list of categories of user feedback;
   determining a group latent variable representing semantic information for the plurality of user reviews;
   determining a respective category latent variable for each category of the first list of categories using the group latent variable, each category latent variable representing category-specific information from the plurality of user reviews for a respective category of the first list of categories;
   generating a first review latent variable for a first user review of the plurality of user reviews, the first review latent variable being generated using a first category latent variable of a first category of the first list of categories, the first review latent variable representing information of the first user review that is relevant to the first category;
   generating, by a decoder, using the first review latent variable corresponding to the first category, a first summary of the first user review of the plurality of user reviews, the first summary being specific to the first category;
   generating, by the decoder using a second review latent variable corresponding to a second category of the first list of categories, a second summary of the first user review of the plurality of user reviews, the second summary being specific to the second category; and
   generating output data comprising the first summary and the second summary.

2. The computer-implemented method of claim 1, further comprising:
   determining a third category of the first list of categories;
   determining a first probability that user reviews of the plurality of user reviews relate to the third category;
   determining that the first probability is less than a threshold probability; and
   determining that no summary is generated for the third category for the plurality of user reviews.

3. The computer-implemented method of claim 1, wherein the first summary is an abstractive summary of the user reviews relevant to the first category generated by the decoder of a variational autoencoder.

4. A method of operating a computer system to generate summaries in a number of different categories from received text, the method comprising:
   receiving a plurality of text descriptions of a first item, the plurality of text descriptions including at least a first text description;
   determining a list of categories relevant to the plurality of text descriptions, the list of categories including at least a first category and a second category;
   determining a first category-specific representation of the plurality of text descriptions, the first category-specific representation representing words of the plurality of text descriptions that are semantically associated with the first category;
   determining a second category-specific representation of the plurality of text descriptions, the second category-specific representation representing words of the plurality of text descriptions that are semantically associated with the second category;
   generating, using at least one machine learned model, a first summary of the first text description based at least in part on the first category-specific representation, the first summary being relevant to the first category; and
   generating, using the at least one machine learned model, a second summary of the first text description based at least in part on the second category-specific representation, the second summary being relevant to the second category of the list of categories; and
   generating first output data comprising the first summary and the second summary.

5. The method of claim 4, further comprising:
   receiving the plurality of text descriptions as an input; and
   determining the list of categories based at least in part on a semantic representation of the plurality of text descriptions.

6. The method of claim 4, further comprising:
   determining a third category of the list of categories;
   determining a first probability that at least some of the plurality of text descriptions relate to the third category;
   determining that the first probability is less than a threshold probability; and
   determining that no summary is generated for the third category.

7. The method of claim 4, further comprising:
   generating, by a first machine learned model, a list of non-overlapping phrases relevant to the first category among the plurality of text descriptions of the first item; and
   generating second output data comprising the list of non-overlapping phrases relevant to the first category.

8. The method of claim 4, wherein the first summary is an abstractive summary generated using a variational autoencoder.

9. The method of claim 4, wherein the first summary comprises one or more sentences summarizing portions of the plurality of text descriptions that relate to the first category and wherein the first summary excludes information from the plurality of text descriptions that relate to other categories.

10. The method of claim 4, further comprising:
    determining, for the first text description of the plurality of text descriptions, a first probability that the first text description corresponds to the first category; and
    determining, for the first text description of the plurality of text descriptions, a second probability that the first text description corresponds to the second category.

11. The method of claim 10, further comprising generating, using a decoder network of a variational autoencoder, the first summary based at least in part on a latent code $z_1$ associated with the first text description and the first probability.

12. The method of claim 11, wherein the latent code $z_1$ is generated by an encoder of the variational autoencoder and wherein the latent code $z_1$ is associated with the first category and semantically represents content of the plurality of text descriptions of the first item.

13. A system comprising:
    at least one processor; and
    at least one non-transitory computer-readable memory storing instructions that, when executed by the at least one processor, are effective to program the at least one processor to:
        receive a plurality of text descriptions of a first item, the plurality of text descriptions including at least a first text description;
        determine a list of categories relevant to the plurality of text descriptions, the list of categories including at least a first category and a second category;
        determine a first category-specific representation of the plurality of text descriptions, the first category-specific representation representing words of the plurality of text descriptions that are semantically associated with the first category;
        determine a second category-specific representation of the plurality of text descriptions, the second category-specific representation representing words of the plurality of text descriptions that are semantically associated with the second category;
        generate, using at least one machine learned model, a first summary of the first text description based at least in part on the first category-specific representation, the first summary being relevant to the first category; and
        generate, using the at least one machine learned model, a second summary of the first text description based at least in part on the second category-specific representation, the second summary being relevant to the second category of the list of categories; and
        generate first output data comprising the first summary and the second summary.

14. The system of claim 13, wherein the at least one non-transitory computer-readable memory stores further instructions that, when executed by the at least one processor, are further effective to:
    receive the plurality of text descriptions as an input; and
    determine the list of categories based at least in part on a semantic representation of the plurality of text descriptions.

15. The system of claim 13, wherein the at least one non-transitory computer-readable memory stores further instructions that, when executed by the at least one processor, are further effective to program the at least one processor to:
    determine a third category of the list of categories;
    determine a first probability that at least some of the plurality of text descriptions relate to the third category;
    determine that the first probability is less than a threshold probability; and
    determine that no summary is generated for the third category.

16. The system of claim 13, wherein to determine that first text data is off-topic with respect to first content, the at least one processor is further effective to:
    generate, by a first machine learned model, a list of non-overlapping phrases relevant to the first category among the plurality of text descriptions of the first item; and
    generate second output data comprising the list of non-overlapping phrases relevant to the first category.

17. The system of claim 13, wherein the first summary is an abstractive summary generated using a variational autoencoder.

18. The system of claim 13, wherein the first summary comprises one or more sentences summarizing portions of the plurality of text descriptions that relate to the first category and wherein the first summary excludes information from the plurality of text descriptions that relate to other categories.

19. The system of claim 13, wherein the at least one non-transitory computer-readable memory stores further instructions that, when executed by the at least one processor, are further effective to program the at least one processor to:
    determine, for the first text description of the plurality of text descriptions, a first probability that the first text description corresponds to the first category; and
    determine, for the first text description of the plurality of text descriptions, a second probability that the first text description corresponds to the second category.

20. The system of claim 19, wherein the at least one non-transitory computer-readable memory stores further instructions that, when executed by the at least one processor, are further effective to program the at least one processor to:
    generating, using a decoder network of a variational autoencoder, the first summary based at least in part on a latent code $z_1$ associated with the first text description and the first probability.

* * * * *